United States Patent
Casey et al.

(10) Patent No.: US 8,112,449 B2
(45) Date of Patent: Feb. 7, 2012

(54) SYSTEMS AND METHODS FOR IMPLEMENTING A CONTENT OBJECT ACCESS POINT

(75) Inventors: Steven M. Casey, Littleton, CO (US); Bruce A. Phillips, Erie, CO (US)

(73) Assignee: Qwest Communications International Inc., Denver, CO (US)

( * ) Notice: Subject to any disclaimer, the term of this patent is extended or adjusted under 35 U.S.C. 154(b) by 585 days.

(21) Appl. No.: 10/632,661

(22) Filed: Aug. 1, 2003

(65) Prior Publication Data

US 2005/0027715 A1 Feb. 3, 2005

(51) Int. Cl.
*G06F 17/30* (2006.01)
*H04M 1/00* (2006.01)

(52) U.S. Cl. .................... 707/802; 379/413.02

(58) Field of Classification Search .......... 707/101, 707/104.1, 100, 103, 828, 805, 801–803; 709/221, 209; 379/265.09; 715/239, 248, 715/249; 725/44, 47
See application file for complete search history.

(56) References Cited

U.S. PATENT DOCUMENTS

| | | |
|---|---|---|
| 4,775,997 A | 10/1988 | West, Jr. et al. |
| 4,959,719 A | 9/1990 | Strubbe et al. |
| 4,989,230 A | 1/1991 | Gillig et al. |
| 5,111,296 A | 5/1992 | Duffield et al. |
| 5,202,765 A | 4/1993 | Lineberry |
| 5,327,156 A | 7/1994 | Masukane et al. |
| 5,361,098 A | 11/1994 | Lucas |
| 5,369,696 A | 11/1994 | Krauss et al. |
| 5,398,074 A | 3/1995 | Duffield et al. |
| 5,418,559 A | 5/1995 | Blahut |
| 5,463,422 A | 10/1995 | Simpson et al. |
| 5,485,221 A | 1/1996 | Banker et al. |
| 5,488,412 A | 1/1996 | Majeti et al. |
| 5,511,114 A | 4/1996 | Stimson et al. |
| 5,526,403 A | 6/1996 | Tam |
| 5,541,670 A | 7/1996 | Hanai |
| 5,541,671 A | 7/1996 | Pugel |
| 5,559,549 A | 9/1996 | Hendricks et al. |
| 5,585,837 A | 12/1996 | Nixon |
| 5,602,598 A | 2/1997 | Shintani |
| 5,621,429 A | 4/1997 | Yamaashi et al. |
| 5,621,482 A | 4/1997 | Gardner et al. |
| 5,621,787 A | 4/1997 | McKoy et al. |
| 5,633,683 A | 5/1997 | Rosengren et al. |
| 5,635,980 A | 6/1997 | Lin et al. |
| 5,638,112 A | 6/1997 | Bestler et al. |
| 5,657,076 A | 8/1997 | Tapp |
| 5,671,019 A | 9/1997 | Isoe et al. |

(Continued)

OTHER PUBLICATIONS

Advanced MP3 Music Extractor 3 software. http://www.versiontracker.com/dyn/moreinfo/win/10155216. Release date Jan. 7, 2003.*

(Continued)

*Primary Examiner* — Robert Timblin

(57) ABSTRACT

Systems and methods for accessing and distributing content objects. Various of the systems and methods utilize a number of content object entities that can be sources and/or destinations for content objects. A combination of abstraction and distinction engines can be used to access content objects from a source of content objects, format and/or modify the content objects, and redistribute the modified content object to one or more content object destinations. In some cases, an access point is included that identifies a number of available content objects, and identifies one or more content object destinations to which the respective content objects can be directed.

17 Claims, 4 Drawing Sheets

U.S. PATENT DOCUMENTS

| | | | |
|---|---|---|---|
| 5,673,692 A | 10/1997 | Schulze et al. | |
| 5,675,390 A | 10/1997 | Schindler et al. | |
| 5,689,705 A | 11/1997 | Fino et al. | |
| 5,691,777 A | 11/1997 | Kasstly | |
| 5,694,616 A | 12/1997 | Johnson et al. | |
| 5,717,748 A | 2/1998 | Sneed et al. | |
| 5,740,075 A | 4/1998 | Bigham et al. | |
| 5,748,255 A | 5/1998 | Johnson et al. | |
| 5,760,842 A | 6/1998 | Song | |
| 5,771,465 A | 6/1998 | Bojeryd | |
| 5,774,172 A | 6/1998 | Kapell et al. | |
| 5,774,664 A | 6/1998 | Hidary et al. | |
| 5,774,666 A | 6/1998 | Portuesi | |
| 5,774,885 A | 6/1998 | Delfer, III | |
| 5,781,620 A | 7/1998 | Montgomery et al. | |
| 5,784,683 A * | 7/1998 | Sistanizadeh et al. | 725/73 |
| 5,790,201 A | 8/1998 | Antos | |
| 5,790,775 A | 8/1998 | Marks et al. | |
| 5,815,216 A | 9/1998 | Suh | |
| 5,831,591 A | 11/1998 | Suh | |
| 5,844,552 A | 12/1998 | Gaughan et al. | |
| 5,857,203 A * | 1/1999 | Kauffman et al. | 707/200 |
| 5,861,881 A | 1/1999 | Freeman et al. | |
| 5,883,948 A | 3/1999 | Dunn | |
| 5,889,954 A | 3/1999 | Gessel et al. | |
| 5,894,320 A | 4/1999 | Vancelette | |
| 5,900,867 A | 5/1999 | Schindler et al. | |
| 5,900,916 A | 5/1999 | Pauley | |
| 5,901,220 A | 5/1999 | Garver et al. | |
| 5,910,981 A | 6/1999 | Baghat et al. | |
| 5,912,668 A | 6/1999 | Sciammarella et al. | |
| 5,912,711 A | 6/1999 | Lin et al. | |
| 5,923,379 A | 7/1999 | Patterson | |
| 5,969,769 A | 10/1999 | Hamadate | |
| 5,970,386 A | 10/1999 | Williams | |
| 5,971,921 A | 10/1999 | Timbel | |
| 5,977,963 A | 11/1999 | Gaughan et al. | |
| 5,978,451 A | 11/1999 | Swan et al. | |
| 5,983,068 A | 11/1999 | Tomich et al. | |
| 5,999,599 A | 12/1999 | Shaffer et al. | |
| 6,012,100 A | 1/2000 | Frailong et al. | |
| 6,021,434 A * | 2/2000 | Pizano | 709/219 |
| 6,039,578 A | 3/2000 | Suffi et al. | |
| 6,058,430 A | 5/2000 | Kaplan | |
| 6,061,719 A | 5/2000 | Bendinelli et al. | |
| 6,069,899 A | 5/2000 | Foley | |
| 6,070,127 A | 5/2000 | Hirono et al. | |
| 6,073,140 A | 6/2000 | Morgan et al. | |
| 6,073,171 A | 6/2000 | Gaughan et al. | |
| 6,078,661 A | 6/2000 | Arnett et al. | |
| 6,084,638 A | 7/2000 | Hare et al. | |
| 6,097,383 A | 8/2000 | Gaughan et al. | |
| 6,128,389 A | 10/2000 | Chan et al. | |
| 6,134,320 A | 10/2000 | Swan et al. | |
| 6,188,397 B1 | 2/2001 | Humpleman | |
| 6,201,538 B1 | 3/2001 | Wugofski | |
| 6,202,212 B1 | 3/2001 | Sturgeon et al. | |
| 6,208,384 B1 | 3/2001 | Schultheiss | |
| 6,208,637 B1 | 3/2001 | Eames | |
| 6,209,025 B1 | 3/2001 | Bellamy | |
| 6,212,585 B1 | 4/2001 | Chrabaszcz | |
| 6,229,890 B1 | 5/2001 | Kerr et al. | |
| 6,256,624 B1 | 7/2001 | Pollard et al. | |
| 6,256,785 B1 | 7/2001 | Klappert et al. | |
| 6,259,440 B1 | 7/2001 | Vaughan et al. | |
| 6,272,680 B1 | 8/2001 | Gaughan et al. | |
| 6,282,189 B1 | 8/2001 | Eames | |
| 6,288,749 B1 | 9/2001 | Freadman | |
| 6,299,526 B1 | 10/2001 | Cowan et al. | |
| 6,300,980 B1 | 10/2001 | McGraw et al. | |
| 6,313,851 B1 | 11/2001 | Matthews et al. | |
| 6,317,164 B1 | 11/2001 | Hrusecky et al. | |
| 6,322,375 B1 | 11/2001 | Cole et al. | |
| 6,324,184 B1 | 11/2001 | Hou et al. | |
| 6,324,694 B1 | 11/2001 | Watts et al. | |
| 6,326,982 B1 | 12/2001 | Wu et al. | |
| 6,327,363 B1 | 12/2001 | Henderson et al. | |
| 6,330,285 B1 | 12/2001 | Crosby et al. | |
| 6,331,852 B1 | 12/2001 | Gould et al. | |
| 6,333,976 B2 | 12/2001 | Lesley | |
| 6,337,717 B1 | 1/2002 | Nason et al. | |
| 6,349,410 B1 | 2/2002 | Lortz | |
| 6,357,045 B1 | 3/2002 | Devaney | |
| 6,359,973 B1 | 3/2002 | Rahamim et al. | |
| 6,377,861 B1 | 4/2002 | York | |
| 6,381,745 B1 | 4/2002 | Paul | |
| 6,392,664 B1 | 5/2002 | White et al. | |
| 6,396,480 B1 | 5/2002 | Schindler et al. | |
| 6,397,256 B1 | 5/2002 | Chan et al. | |
| 6,405,371 B1 | 6/2002 | Oosterhout et al. | |
| 6,441,861 B2 | 8/2002 | Vaughan et al. | |
| 6,443,890 B1 | 9/2002 | Schulze et al. | |
| 6,445,694 B1 * | 9/2002 | Swartz | 370/352 |
| 6,452,611 B1 | 9/2002 | Gerba et al. | |
| 6,452,923 B1 | 9/2002 | Gerszberg et al. | |
| 6,456,335 B1 | 9/2002 | Miura et al. | |
| 6,456,340 B1 | 9/2002 | Margulis | |
| 6,463,273 B1 | 10/2002 | Day | |
| 6,481,012 B1 | 11/2002 | Gordon et al. | |
| 6,481,013 B1 | 11/2002 | Dinwiddie et al. | |
| 6,486,892 B1 | 11/2002 | Stern | |
| 6,492,997 B1 | 12/2002 | Gerba et al. | |
| 6,493,036 B1 | 12/2002 | Fernandez | |
| 6,493,038 B1 | 12/2002 | Singh et al. | |
| 6,493,878 B1 | 12/2002 | Kassatly | |
| 6,502,242 B1 | 12/2002 | Howe et al. | |
| 6,505,123 B1 | 1/2003 | Root et al. | |
| 6,510,152 B1 | 1/2003 | Gerszberg et al. | |
| 6,510,533 B1 | 1/2003 | Siek et al. | |
| 6,510,557 B1 | 1/2003 | Thrift | |
| 6,512,551 B1 | 1/2003 | Cheney et al. | |
| 6,512,552 B1 | 1/2003 | Subramanian | |
| 6,519,283 B1 | 2/2003 | Cheney et al. | |
| 6,526,579 B2 | 2/2003 | Sato | |
| 6,526,581 B1 | 2/2003 | Edson | |
| 6,536,041 B1 | 3/2003 | Knudson et al. | |
| 6,538,701 B1 | 3/2003 | Yuen | |
| 6,542,500 B1 | 4/2003 | Gerszberg et al. | |
| 6,544,174 B2 | 4/2003 | West et al. | |
| 6,556,251 B1 | 4/2003 | Sorensen | |
| 6,556,252 B1 | 4/2003 | Kim | |
| 6,556,253 B1 | 4/2003 | Megied et al. | |
| 6,563,515 B1 | 5/2003 | Reynolds et al. | |
| 6,567,106 B1 | 5/2003 | Wugofski | |
| 6,567,981 B1 * | 5/2003 | Jeffrey | 725/80 |
| 6,567,984 B1 | 5/2003 | Allport | |
| 6,574,236 B1 | 6/2003 | Gosselin et al. | |
| 6,580,710 B1 | 6/2003 | Bowen et al. | |
| 6,590,615 B2 | 7/2003 | Murakami et al. | |
| 6,593,937 B2 | 7/2003 | Ludtke et al. | |
| 6,611,840 B1 * | 8/2003 | Baer et al. | 707/102 |
| 6,621,870 B1 | 9/2003 | Gordon et al. | |
| 6,625,144 B1 | 9/2003 | El-Batal et al. | |
| 6,628,302 B2 | 9/2003 | White et al. | |
| 6,640,239 B1 | 10/2003 | Gidwani | |
| 6,658,464 B2 | 12/2003 | Reisman | |
| 6,678,007 B2 | 1/2004 | Nason et al. | |
| 6,678,009 B2 | 1/2004 | Kahn | |
| 6,687,374 B2 | 2/2004 | Leuca et al. | |
| 6,700,625 B1 | 3/2004 | Fujii | |
| 6,714,264 B1 | 3/2004 | Kempisty | |
| 6,727,886 B1 | 4/2004 | Mielekamp et al. | |
| 6,727,918 B1 | 4/2004 | Nason | |
| 6,727,960 B2 | 4/2004 | Seo | |
| 6,728,780 B1 | 4/2004 | Hebert | |
| 6,732,373 B2 | 5/2004 | Harrison et al. | |
| 6,738,820 B2 | 5/2004 | Hilt | |
| 6,741,617 B2 | 5/2004 | Rosengren et al. | |
| 6,745,021 B1 | 6/2004 | Stevens | |
| 6,757,707 B1 | 6/2004 | Houghton et al. | |
| 6,760,782 B1 | 7/2004 | Swales | |
| 6,784,945 B2 | 8/2004 | Norsworthy et al. | |
| 6,785,906 B1 | 8/2004 | Gaughan et al. | |
| 6,795,506 B1 | 9/2004 | Zhng et al. | |
| 6,807,564 B1 | 10/2004 | Zellner et al. | |
| 6,809,776 B1 | 10/2004 | Simpson | |
| 6,816,878 B1 | 11/2004 | Zimmers et al. | |

| | | | | | |
|---|---|---|---|---|---|
| 6,819,682 B1 | 11/2004 | Rabenko et al. | 2003/0013441 A1 | 1/2003 | Bhogal et al. |
| 6,820,157 B1 | 11/2004 | Eide et al. | 2003/0016304 A1 | 1/2003 | Norworthy et al. |
| 6,833,874 B2 | 12/2004 | Ozaki et al. | 2003/0026416 A1 | 2/2003 | Fusco |
| 6,833,877 B2 | 12/2004 | Wang | 2003/0026418 A1 | 2/2003 | Fusco |
| 6,842,628 B1 | 1/2005 | Arnold et al. | 2003/0027521 A1 | 2/2003 | Yip et al. |
| 6,857,131 B1 | 2/2005 | Yagawa et al. | 2003/0027565 A1 | 2/2003 | Bossemeyer et al. |
| 6,882,714 B2 | 4/2005 | Mansfield | 2003/0028879 A1 | 2/2003 | Gordon et al. |
| 6,882,795 B1 * | 4/2005 | McMurdie et al. ............ 386/125 | 2003/0030652 A1 | 2/2003 | Billmaier et al. |
| 6,889,385 B1 | 5/2005 | Rakib et al. | 2003/0035075 A1 | 2/2003 | Butler et al. |
| 6,894,999 B1 | 5/2005 | Acharya | 2003/0056215 A1 | 3/2003 | Kanungo et al. |
| 6,896,276 B1 | 5/2005 | Sparrow | 2003/0066082 A1 | 4/2003 | Kliger et al. |
| 6,898,413 B2 | 5/2005 | Yip et al. | 2003/0067926 A1 | 4/2003 | Gerszberg et al. |
| 6,903,753 B1 | 6/2005 | Gray et al. | 2003/0069002 A1 | 4/2003 | Hunter et al. |
| 6,909,903 B2 | 6/2005 | Wang | 2003/0072330 A1 | 4/2003 | Yang et al. |
| 6,924,846 B2 | 8/2005 | Ohba et al. | 2003/0074372 A1 | 4/2003 | Barchi et al. |
| 6,934,753 B2 | 8/2005 | Kim | 2003/0083533 A1 | 5/2003 | Gerba et al. |
| 6,948,076 B2 | 9/2005 | Saito | 2003/0152207 A1 | 8/2003 | Ryan |
| 6,957,275 B1 | 10/2005 | Sekiguchi | 2003/0179858 A1 | 9/2003 | Bella et al. |
| 6,970,127 B2 | 11/2005 | Rakib | 2003/0184679 A1 | 10/2003 | Meehan |
| 6,970,181 B1 | 11/2005 | Fadel | 2003/0189935 A1 | 10/2003 | Warden et al. |
| 6,975,324 B1 | 12/2005 | Valmiki et al. | 2003/0192057 A1 | 10/2003 | Gaughan et al. |
| 6,978,474 B1 | 12/2005 | Sheppard et al. | 2003/0201889 A1 | 10/2003 | Zulkowski |
| 6,987,734 B2 | 1/2006 | Hundemer | 2003/0225641 A1 | 12/2003 | Gritzmacher et al. |
| 7,010,608 B2 | 3/2006 | Garg et al. | 2003/0226143 A1 | 12/2003 | Michael et al. |
| 7,020,652 B2 | 3/2006 | Matz et al. | 2003/0236916 A1 | 12/2003 | Adcox et al. |
| 7,023,492 B2 | 4/2006 | Sullivan | 2004/0004538 A1 | 1/2004 | Manis et al. |
| 7,024,677 B1 | 4/2006 | Snyder et al. | 2004/0006772 A1 | 1/2004 | Ansari et al. |
| 7,028,327 B1 | 4/2006 | Dougherty et al. | 2004/0019396 A1 * | 1/2004 | McMahon et al. .............. 700/94 |
| 7,028,330 B1 | 4/2006 | Gaughan et al. | 2004/0025012 A1 * | 2/2004 | Burks .......................... 713/161 |
| 7,032,241 B1 | 4/2006 | Venkatachary et al. | 2004/0027487 A1 | 2/2004 | Rzadzki et al. |
| 7,035,270 B2 | 4/2006 | Moore et al. | 2004/0049785 A1 | 3/2004 | Grzeczkowski et al. |
| 7,055,169 B2 | 5/2006 | Delpuch et al. | 2004/0052343 A1 | 3/2004 | Glaser et al. |
| 7,096,487 B1 | 8/2006 | Gordon et al. | 2004/0052578 A1 | 3/2004 | Baldino et al. |
| 7,099,443 B2 | 8/2006 | Phillips et al. | 2004/0073941 A1 | 4/2004 | Ludvig et al. |
| 7,102,691 B2 | 9/2006 | Dischert et al. | 2004/0078457 A1 | 4/2004 | Tindal |
| 7,136,945 B2 * | 11/2006 | Gibbs et al. ................ 710/62 | 2004/0092276 A1 | 5/2004 | Doodley |
| 7,180,988 B2 | 2/2007 | Phillips et al. | 2004/0093492 A1 | 5/2004 | Daude et al. |
| 7,187,418 B2 | 3/2007 | Phillips et al. | 2004/0100975 A1 | 5/2004 | Kreiner et al. |
| 7,203,966 B2 * | 4/2007 | Abburi et al. ................ 726/29 | 2004/0107356 A1 * | 6/2004 | Shamoon et al. ............. 713/193 |
| 7,206,029 B2 | 4/2007 | Cohen-Solal | 2004/0136373 A1 | 7/2004 | Bareis |
| 7,233,781 B2 | 6/2007 | Hunter et al. | 2004/0141758 A1 | 7/2004 | El-Reedy |
| 7,263,362 B1 | 8/2007 | Young et al. | 2004/0150158 A1 | 8/2004 | Biegelsen et al. |
| 7,264,590 B2 | 9/2007 | Casey et al. | 2004/0150518 A1 | 8/2004 | Phillips et al. |
| 7,272,613 B2 * | 9/2007 | Sim et al. .................... 707/102 | 2004/0150748 A1 | 8/2004 | Phillips et al. |
| 7,283,045 B1 | 10/2007 | Manz | 2004/0150749 A1 * | 8/2004 | Phillips et al. ................ 348/565 |
| 7,283,505 B1 | 10/2007 | Meenan et al. | 2004/0150750 A1 | 8/2004 | Phillips et al. |
| 7,292,590 B1 | 11/2007 | Chen et al. | 2004/0150751 A1 | 8/2004 | Phillips et al. |
| 7,376,191 B2 | 5/2008 | Melick et al. | 2004/0151161 A1 | 8/2004 | Casey et al. |
| 7,483,958 B1 * | 1/2009 | Elabbady et al. ............. 709/217 | 2004/0151168 A1 | 8/2004 | Phillips et al. |
| 7,519,353 B2 | 4/2009 | Stevens et al. | 2004/0151289 A1 | 8/2004 | Phillips et al. |
| 7,793,337 B2 | 9/2010 | Casey et al. | 2004/0151290 A1 | 8/2004 | Magarasevic et al. |
| 2001/0021997 A1 | 9/2001 | Lee | 2004/0152493 A1 | 8/2004 | Phillips et al. |
| 2001/0024239 A1 | 9/2001 | Feder et al. | 2004/0153289 A1 | 8/2004 | Casey et al. |
| 2001/0031066 A1 * | 10/2001 | Meyer et al. .................. 382/100 | 2004/0153577 A1 | 8/2004 | Phillips et al. |
| 2001/0034754 A1 * | 10/2001 | Elwahab et al. .............. 709/201 | 2004/0153670 A1 | 8/2004 | Casey et al. |
| 2001/0048481 A1 | 12/2001 | Hatano et al. | 2004/0160460 A1 | 8/2004 | Casey et al. |
| 2001/0051980 A1 | 12/2001 | Raciborski et al. | 2004/0163125 A1 | 8/2004 | Phillips et al. |
| 2002/0021465 A1 | 2/2002 | Moore et al. | 2004/0163126 A1 | 8/2004 | Phillips et al. |
| 2002/0022991 A1 | 2/2002 | Sharood et al. | 2004/0163128 A1 | 8/2004 | Phillips et al. |
| 2002/0026642 A1 | 2/2002 | Augenbraun et al. | 2004/0168199 A1 | 8/2004 | Phillips et al. |
| 2002/0037004 A1 | 3/2002 | Bossemeyer et al. | 2004/0172657 A1 | 9/2004 | Phillips et al. |
| 2002/0044225 A1 | 4/2002 | Rakib | 2004/0176085 A1 | 9/2004 | Phillips et al. |
| 2002/0051119 A1 * | 5/2002 | Sherman et al. .................. 352/1 | 2004/0177163 A1 | 9/2004 | Casey et al. |
| 2002/0054062 A1 | 5/2002 | Gerba et al. | 2004/0181813 A1 | 9/2004 | Ota et al. |
| 2002/0056009 A1 * | 5/2002 | Affif et al. ..................... 709/246 | 2004/0184523 A1 | 9/2004 | Dawson et al. |
| 2002/0057372 A1 | 5/2002 | Cavallerano et al. | 2004/0213286 A1 | 10/2004 | Jette et al. |
| 2002/0066110 A1 | 5/2002 | Cloonan et al. | 2004/0252675 A1 | 12/2004 | Lund |
| 2002/0089605 A1 | 7/2002 | Min | 2004/0264687 A1 | 12/2004 | Casey et al. |
| 2002/0100054 A1 | 7/2002 | Feinberg et al. | 2005/0018653 A1 | 1/2005 | Phillips et al. |
| 2002/0110115 A1 | 8/2002 | Gorman et al. | 2005/0022007 A1 | 1/2005 | Phillips et al. |
| 2002/0116720 A1 | 8/2002 | Terry et al. | 2005/0027715 A1 | 2/2005 | Casey et al. |
| 2002/0122136 A1 | 9/2002 | Safadi et al. | 2005/0034155 A1 | 2/2005 | Gordon et al. |
| 2002/0129154 A1 | 9/2002 | Okawa et al. | 2005/0041787 A1 | 2/2005 | Casey et al. |
| 2002/0147987 A1 | 10/2002 | Reynolds et al. | 2005/0048957 A1 | 3/2005 | Casey et al. |
| 2002/0171552 A1 | 11/2002 | Tate | 2005/0064831 A1 | 3/2005 | Feenstra et al. |
| 2002/0175998 A1 | 11/2002 | Hoang | 2005/0091695 A1 | 4/2005 | Paz et al. |
| 2002/0180579 A1 | 12/2002 | Nagaoka et al. | 2005/0149981 A1 | 7/2005 | Augenbraun et al. |
| 2002/0184457 A1 * | 12/2002 | Yuasa et al. .................. 711/161 | 2005/0166232 A1 | 7/2005 | Lamkin et al. |
| 2002/0196933 A1 * | 12/2002 | Brower et al. ................ 379/419 | 2006/0020992 A1 | 1/2006 | Pugel et al. |

| | | |
|---|---|---|
| 2006/0031457 A1* | 2/2006 | Motoyama .................... 709/224 |
| 2006/0031582 A1 | 2/2006 | Pugel et al. |
| 2006/0156368 A1 | 7/2006 | Campbell |
| 2006/0259941 A1 | 11/2006 | Goldberg et al. |
| 2010/0293599 A1 | 11/2010 | Casey et al. |

OTHER PUBLICATIONS

Frank, Edward and Holloway, Jack; "Connecting the Home with a Phone Line Network Chip Set", IEEE Micro, Mar.-Apr. 2000, pp. 2-14.

2004_Mar.—Quality Validation_Implementation Guide—A Customer_Public Information Publication_26 Pages.

Emergency Alert System Procedures, 2001 Cable Handbook, 2001, pp. 1-31, FCC, U.S.A.

FCC News Release entitled, "FCC Amends Emergency Alert System Rules, Includes Child Abduction Alerts", Feb. 26, 2002, from website www.fcc.gov/eb/News_Releases/DOC-220252A1.html.

Federal Communications Commission Fact Sheet entitled, "The Emergency Alert System (EAS)", from website www.fcc.gov/eb/easfact.html.

Document entitled, "Notice Regarding FCC Certification of EAS Decoder", Sep. 19, 2002, No. DA-02-2312, from website www.fcc.gov/eb/Public_Notices/DA-02-2312A1.html.

Gordon et al., U.S. Appl. No. 09/359,560, filed Jul. 22, 1999.

NextNet Wireless, "NextNet Expedience—NLOS Plug-And-Play Portable Customer Premise Equipment Integrated Radio Modem, Non Line-Of-Sight Broadband Wireless Residential Subscriber Unit (RSU-2510A)," 2 pages, 2003.

U.S. Appl. No. 10/356,364, Office Action dated Sep. 29, 2005, 9 pgs.
U.S. Appl. No. 10/356,364, Final Office Action dated Apr. 7, 2006, 9 pages.
U.S. Appl. No. 10/356,364, Notice of Allowance dated Oct. 17, 2006, 4 pgs.
U.S. Appl. No. 10/356,364, Supplemental Notice of Allowance dated Dec. 5, 2006, 2 pgs.
U.S. Appl. No. 10/356,364, Issue Notification dated Jan. 31, 2007, 1 pgs.
U.S. Appl. No. 10/356,688, Office Action dated Jul. 29, 2005, 15 pages.
U.S. Appl. No. 10/356,688, Final Office Action dated Jan. 25, 2006, 15 pages.
U.S. Appl. No. 10/356,688, Office Action dated Jun. 19, 2006, 13 pages.
U.S. Appl. No. 10/356,688, Office Action dated Nov. 27, 2006, 14 pages.
U.S. Appl. No. 10/356,688, Final Office Action dated Jun. 5, 2007, 15 pages.
U.S. Appl. No. 10/356,688, Final Office Action dated Dec. 31, 2007, 14 pages.
U.S. Appl. No. 10/356,688, Notice of Allowance dated Jul. 9, 2008, 5 pages.
U.S. Appl. No. 10/356,688, Issue Notification dated Oct. 29, 2008, 1 pages.
U.S. Appl. No. 10/356,688, filed Jan. 31, 2003 now US Patent No. 7,454,006, 57 pages.
U.S. Appl. No. 10/356,338, Office Action dated Dec. 30, 2008, 43 pages.
U.S. Appl. No. 10/356,338, Final Office Action dated Jul. 7, 2009, 27 pages.
U.S. Appl. No. 10/367,596, Office Action dated Sep. 30, 2005, 9 pages.
U.S. Appl. No. 10/367,596, Final Office Action dated Feb. 10, 2006, 7 pgs.
U.S. Appl. No. 10/367,596, Advisory Action dated Apr. 13, 2006, 3 pgs.
U.S. Appl. No. 10/367,596, Appeal Brief dated Jul. 7, 2006, 17 pgs.
U.S. Appl. No. 10/367,596, Final Office Action dated Sep. 8, 2006, 6 pgs.
U.S. Appl. No. 10/367,596, Office Action dated Dec. 18, 2006, 6 pgs.
U.S. Appl. No. 10/367,596, Final Office Action dated May 25, 2007, 7 pgs.
U.S. Appl. No. 10/367,596, Final Office Action dated Sep. 28, 2007, 6 pgs.
U.S. Appl. No. 10/367,596, Office Action dated Mar. 31, 2008, 6 pgs.
U.S. Appl. No. 10/367,596, Advisory Action dated Mar. 4, 2009, 14 pgs.
U.S. Appl. No. 10/367,596, Appeal Brief dated Mar. 13, 2009, 18 pgs.
U.S. Appl. No. 10/367,596, Appeal Brief dated Apr. 20, 2009, 2 pgs.
U.S. Appl. No. 10/377,281, Office Action dated Dec. 21, 2005, 13 pages.
U.S. Appl. No. 10/377,281, Final Office Action dated May 24, 2006, 10 pages.
U.S. Appl. No. 10/377,281, Office Action dated Oct. 11, 2006, 9 pages.
U.S. Appl. No. 10/377,281, Office Action dated Mar. 26, 2007, 9 pages.
U.S. Appl. No. 10/377,281, Advisory Action dated Jul. 2, 2007, 3 pages.
U.S. Appl. No. 10/377,281, Office Action dated Sep. 26, 2007, 7 pages.
U.S. Appl. No. 10/377,281, Final Office Action dated Apr. 21, 2008, 9 pages.
U.S. Appl. No. 10/137,281, , filed Feb. 27, 2003, 69 pages.
U.S. Appl. No. 10/377,282, filed Feb. 27, 2003, now U.S. Patent No. 7,433,465, 71 pages.
U.S. Appl. No. 10/377,282, Office Action dated Dec. 21, 2005, 14 pages.
U.S. Appl. No. 10/377,282, Final Office Action dated May 24, 2006, 15 pages.
U.S. Appl. No. 10/377,282, Office Action dated Oct. 11, 2006, 11 pages.
U.S. Appl. No. 10/377,282, Final Office Action dated Mar. 23. 2007, 10 pages.
U.S. Appl. No. 10/377,282, Office Action dated Sep. 28, 2007, 9 pages.
U.S. Appl. No. 10/377,282, Final Office Action dated Apr. 8, 2008, 11 pages.
U.S. Appl. No. 10/377,282, Office Action dated Jul. 25, 2008, 11 pages.
U.S. Appl. No. 10/377,283, Office Action dated Dec. 15, 2005, 14 pgs.
U.S. Appl. No. 10/377,283, Office Action dated Oct. 11, 2006, 8 pgs.
U.S. Appl. No. 10/377,283, Final Office Action dated Mar. 26, 2007, 9 pgs.
U.S. Appl. No. 10/377,283, Advisory Action dated Jul. 2, 2007, 3 pgs.
U.S. Appl. No. 10/377,283, Office Action dated Sep. 28, 2007, 9 pgs.
U.S. Appl. No. 10/377,283, Final Office Action dated Mar. 26, 2008, 10 pgs.
U.S. Appl. No. 10/377,283, Advisory Action dated Jun. 3, 2008, 3 pgs.
U.S. Appl. No. 10/377,283, Office Action dated Jul. 25, 2008, 10 pgs.
U.S. Appl. No. 10/377,283, Final Office Action dated May 24, 2006, 11 pages.
U.S. Appl. No. 10/377,283, filed Feb. 27, 2003, 70 pages.
U.S. Appl. No. 10/377,290, Office Action dated Dec. 15, 2005, 12 pages.
U.S. Appl. No. 10/377,290, Final Office Action dated May 24, 2006, 10 pages.
U.S. Appl. No. 10/377,290, Office Action dated Oct. 11, 2006 9 pages.
U.S. Appl. No. 10/377,290, Office Action dated Mar. 26, 2007, 8 pages.
U.S. Appl. No. 10/377,290, Office Action dated Sep. 26, 2007, 8 pages.
U.S. Appl. No. 10/377,290, Final Office Action dated Apr. 21, 2008, 9 pages.
U.S. Appl. No. 10/377,290, filed Feb. 27, 2003, 69 pages.
U.S. Appl. No. 10/377,584, Notice of Allowance dated Oct. 2, 2006, 4 pages.
U.S. Appl. No. 10/377,584, Office Action dated May 11, 2006, 7 pages.
U.S. Appl. No. 10/377,584, Final Office Action dated Mar. 15, 2006, 5 pages.

U.S. Appl. No. 10/377,584, Office Action dated Nov. 17, 2005, 8 pages.
U.S. Appl. No. 10/377,584, filed Feb. 27, 2003, now US Patent No. 7,187,418, 70 pages.
U.S. Appl. No. 10/444,941, Office Action dated Aug. 17, 2007, 20 pgs.
U.S. Appl. No. 10/444,941, Final Office Action dated Dec. 13, 2007, 17 pgs.
U.S. Appl. No. 10/444,941, Office Action dated Jan. 21, 2009, 31 pgs.
U.S. Appl. No. 10/444,941, Final Office Action dated Jun. 23, 2009, 23 pgs.
U.S. Appl. No. 10/444,941, Notice of Appeal dated Jan. 21, 2009, 1 pgs.
U.S. Appl. No. 10/444,941, filed May 22, 2003, 60 pages.
U.S. Appl. No. 10/448,249, Office Action dated Aug. 15, 2007, 19 pgs.
U.S. Appl. No. 10/448,249, Final Office Action dated Feb. 6, 2008, 18 pgs.
U.S. Appl. No. 10/448,249, Advisory Action dated May 2, 2008, 3 pgs.
U.S. Appl. No. 10/448,249, Office Action dated Sep. 4, 2008, 22 pgs.
U.S. Appl. No. 10/448,249, Final Office Action dated Jun. 5, 2009, 34 pgs.
U.S. Appl. No. 10/448,249, filed May 29, 2003, 68 pages.
U.S. Appl. No. 10/624,454, Office Action dated Oct. 2, 2007, 16 pgs.
U.S. Appl. No. 10/624,454, Final Office Action dated Apr. 7, 2008, 10 pgs.
U.S. Appl. No. 10/624,454, Advisory Action dated Jun. 19, 2008, 4 pgs.
U.S. Appl. No. 10/624,454, Office Action dated Jul. 24, 2008, 12 pgs.
U.S. Appl. No. 10/624,454, Final Office Action dated Jan. 7, 2009, 14 pgs.
U.S. Appl. No. 10/624,454, Advisory Action dated Mar. 13, 2009, 3 pgs.
U.S. Appl. No. 10/624,454, Office Action dated May 1, 2009, 13 pgs.
U.S. Appl. No. 10/624,454, filed Jul. 21, 2003, 72 pages.
U.S. Appl. No. 10/652,718, Office Action dated Jun. 6, 2007, 16 pgs.
U.S. Appl. No. 10/652,718, Final Office Action dated Nov. 8, 2007, 14 pgs.
U.S. Appl. No. 10/652,718, Advisory Action dated Jan. 18, 2008, 3 pgs.
U.S. Appl. No. 10/652,718, Appeal Brief Filed dated Apr. 18, 2008, 15 pgs.
U.S. Appl. No. 10/652,718, Supplemental Appeal Brief Filed dated May 1, 2008, 15 pgs.
U.S. Appl. No. 10/652,718, Office Action dated Jul. 31, 2008, 15 pgs.
U.S. Appl. No. 10/652,718, Office Action dated May 28, 2009, 16 pgs.
U.S. Appl. No. 10/676,418, Office Action dated Feb. 23, 2006, 16 pgs.
U.S. Appl. No. 10/676,418, Final Office Action dated Aug. 9, 2006, 14 pages.
U.S. Appl. No. 10/676,418, Notice of Allowance dated Oct. 19, 2006, 12 pgs.
U.S. Appl. No. 10/676,418, Issue Notification dated Feb. 28, 2007, 1 pgs.
U.S. Appl. No. 10/676,418, filed Sep. 30, 2003 No US Patent No.7,194,249, 69 pages.
U.S. Appl. No. 10/676,429, filed Sep. 30, 2003, 68 pages.
U.S. Appl. No. 10/676,429, Office Action dated Mar. 17, 2008, 24 pgs.
U.S. Appl. No. 10/676,429, Final Office Action dated Sep. 26, 2008, 21 pages.
U.S. Appl. No. 10/676,429, Advisory Action dated Dec. 8, 2008, 3 pages.
U.S. Appl. No. 10/676,429, Office Action dated Mar. 5, 2009, 33 pgs.
U.S. Appl. No. 10/676,429, Final Office Action dated Jun. 9, 2009, 35 pgs.
U.S. Appl. No. 10/676,429, Advisory Action dated Aug. 11, 2009, 3 pgs.
U.S. Appl. No. 10/715,878, filed Nov. 17, 2003, now US Patent No. 7,239,698, 77 pages.
U.S. Appl. No. 10/715,878, Office Action dated Sep. 20, 2005, 369 pgs.
U.S. Appl. No. 10/715,878, Final Office Action dated Feb. 14, 2006, 10 pgs.
U.S. Appl. No. 10/715,878, Advisory Action dated Apr. 17, 2006, 3 pgs.
U.S. Appl. No. 10/715,878, Office Action dated May 3, 2006, 11 pgs.
U.S. Appl. No. 10/715,878, Final Office Action dated Sep. 25, 2006, 12 pgs.
U.S. Appl. No. 10/715,878, Notice of Allowance dated Mar. 27, 2007, 9 pgs.
U.S. Appl. No. 10/715,878, Issue Notification dated Jun. 13, 2007, 1 pgs.
U.S. Appl. No. 10/715,879, Office Action dated Oct. 19, 2005, 8 pgs.
U.S. Appl. No. 10/715,879, Final Office Action dated Apr. 7, 2006, 8 pgs.
U.S. Appl. No. 10/715,879, Notice of Allowance dated Jun. 29, 2006, 4 pgs.
U.S. Appl. No. 10/715,879, filed Nov. 17, 2003, now US Patent No. 7,099,443, 78 pages.
U.S. Appl. No. 10/715,881, filed Nov. 17, 2003, 66 pages.
U.S. Appl. No. 10/367,597, filed Feb. 14, 2003, now US Patent No. 7,433,465, 57 pages.
U.S. Appl. No. 10/367,597, Office Action dated Oct. 5, 2007, 7 pgs.
U.S. Appl. No. 10/367,597, Final Office Action dated Feb. 27, 2008, 5 pgs.
U.S. Appl. No. 10/367,597, Notice of Allowance dated May 29, 2008, 6 pgs.
U.S. Appl. No. 10/367,597, Issue Notification dated Sep. 17, 2008, 1 pgs.
U.S. Appl. No. 10/377,280, Office Action dated Jul. 25, 2007, 33 pgs.
U.S. Appl. No. 10/377,280, Final Office Action dated Feb. 15, 2008, 25 pgs.
U.S. Appl. No. 10/377,280, Office Action dated Aug. 26, 2008, 21 pgs.
U.S. Appl. No. 10/377,280, Notice of Allowance dated Feb. 25, 2009, 7 pgs.
U.S. Appl. No. 10/377,280, Office Action dated Apr. 16, 2009, 21 pgs.
U.S. Appl. No. 10/452,996, Office Action dated Jul. 13, 2006, 20 pgs.
U.S. Appl. No. 10/452,996, Final Office Action dated Jan. 3, 2007, 24 pgs.
U.S. Appl. No. 10/452,996, Office Action dated Jul. 13, 2007, 18 pgs.
U.S. Appl. No. 10/452,996, Notice of Allowance dated Jan. 14, 2008, 8 pgs.
U.S. Appl. No. 10/452,996, Issue Notification dated Apr. 30, 2008, 1 pgs.
U.S. Appl. No. 10/452,996, filed Jun. 2, 2003, now US Patent No. 7,376,386, 53 pages.
U.S. Appl. No. 10/632,602, filed Aug. 1, 2003, now US Patent No. 7,240,361, 51 pages.
U.S. Appl. No. 10/632,602, Office Action dated Dec. 12, 2006, 10 pgs.
U.S. Appl. No. 10/632,602, Notice of Allowance dated Apr. 3, 2007, 4 pgs.
U.S. Appl. No. 10/632,602, Issue Notification dated Jun. 13, 2007, 1 pgs.
U.S. Appl. No. 10/644,667, Office Action dated Jul. 15, 2005, 13 pgs.
U.S. Appl. No. 10/644,667, Final Office Action dated Jan. 3, 2006, 12 pgs.
U.S. Appl. No. 10/644,667, Notice of Allowance dated Feb. 27, 2006, 7 pgs.
U.S. Appl. No. 10/644,667, filed Aug. 19, 2003 now US Patent No. 7,054,417, 27 pages.
U.S. Appl. No. 10/445,275, filed May 23, 2003 now US Patent No. 7,264,590, 49 pages.
U.S. Appl. No. 10/445,275, Office Action dated Mar. 28, 2006, 11 pgs.
U.S. Appl. No. 10/445,275, Final Office Action dated Aug. 25, 2006, 8 pgs.
U.S. Appl. No. 10/445,275, Office Action dated May 1, 2007, 4 pgs.
U.S. Appl. No. 10/445,275, Notice of Allowance dated Jul. 12, 2007, 6 pgs.

U.S. Appl. No. 10/445,275, Issue Notification dated Aug. 15, 2007, 1 pgs.
U.S. Appl. No. 10/625,863, Office Action dated Jun. 26, 2007, 16 pgs.
U.S. Appl. No. 10/625,863, Final Office Action dated Dec. 7, 2007, 20 pgs.
U.S. Appl. No. 10/625,863, Office Action dated Jun. 20, 2008, 31 pgs.
U.S. Appl. No. 10/625,863, Final Office Action dated Dec. 5, 2008, 32 pgs.
U.S. Appl. No. 10/625,863, Office Action dated Apr. 1, 2009, 36 pgs.
U.S. Appl. No. 10/625,863, Notice of Allowance dated Sep. 25, 2009, 7 pgs.
Frank, Edward and Holloway, Jack; 'Connecting the Home with a Phone Line Network Chip Set', IEEE Micro, Mar.-Apr. 2000, pp. 2-14.
NextNet Wireless, NextNet Expedience, NLOS Plug-and-Play Portable Customer Premise Equipment Line Integrated Radio Modem, Non Line-of-Sight Broadband Wireless Residential Subscriber Unit (RSU-2510A), http://www.nextnetwireless.com/assets/news/media/PDF/rsu_2510AMOD_rev1.pdf, Sep. 21, 2004, 2 pages.
U.S. Appl. No. 11/733,089, Issue Notification dated Aug. 18, 2010, 1 page.
U.S. Appl. No. 11/733,089, Notice of Allowance dated Apr. 27, 2010, 5 pages.
U.S. Appl. No. 11/733,089, Advisory Action dated Apr. 6, 2010, 3 pages.
U.S. Appl. No. 11/733,089, Final Rejection dated Dec. 10, 2009, 4 pages.
U.S. Appl. No. 11/733,089, Office Action dated Apr. 16, 2009, 11 pages.
U.S. Appl. No. 10/632,602, Issue Notification dated Jun. 13, 2007, 1 page.

* cited by examiner

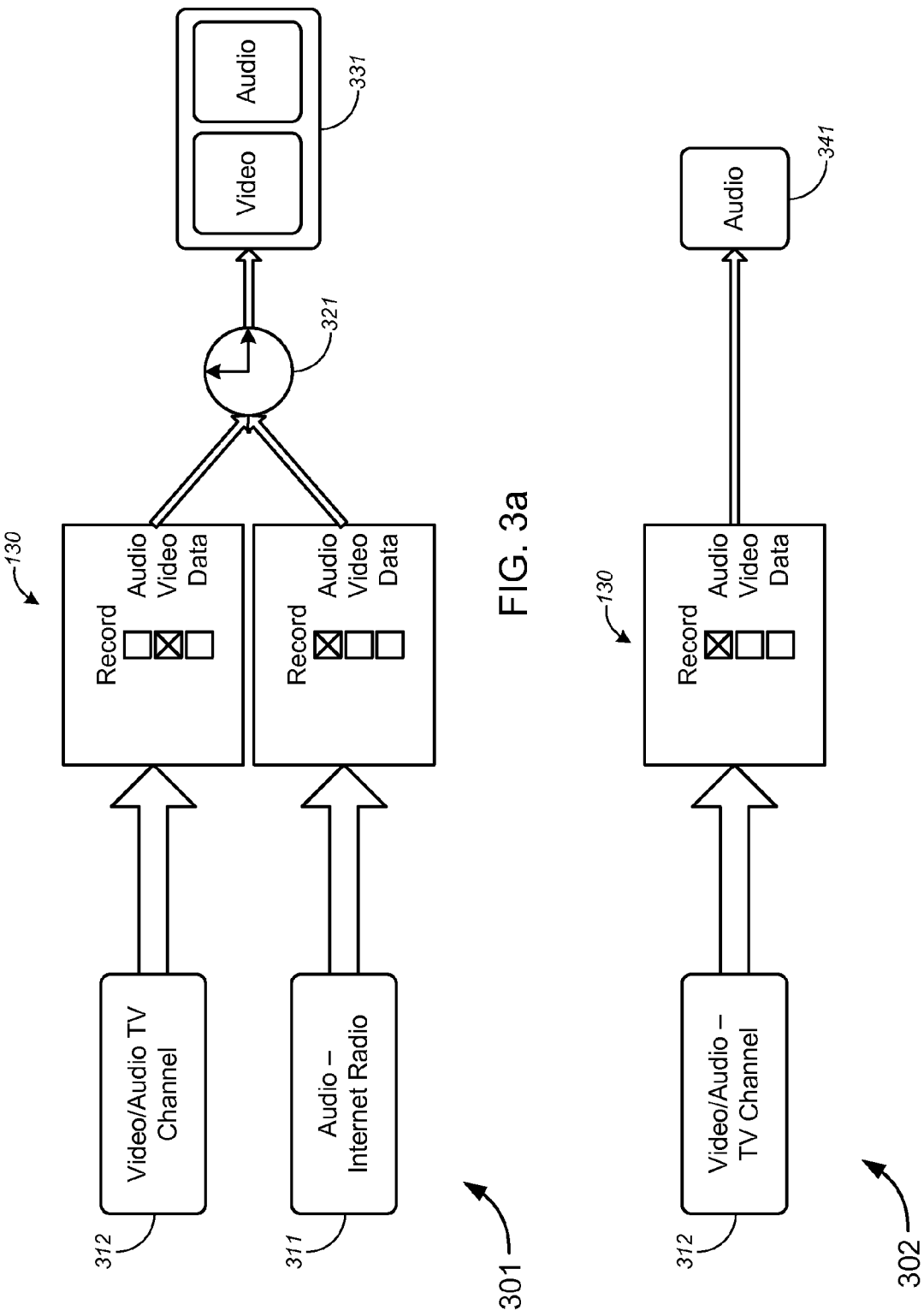

SYSTEMS AND METHODS FOR IMPLEMENTING A CONTENT OBJECT ACCESS POINT

CROSS-REFERENCES TO RELATED APPLICATIONS

The present application is related to U.S. patent application Ser. No. 10/632,602 entitled "Systems And Methods For Controlled Transmittance in a Telecommunication System", and filed by the inventors common hereto and on a date common herewith. The entirety of the aforementioned application is incorporated herein by reference for all purposes.

BACKGROUND OF THE INVENTION

The present invention is related to telecommunication systems in general, and in particular to systems and methods for distributing content objects.

The telecommunication and electronics industries have developed and implemented a large number of incompatible devices and protocols. Thus, in a given consumer's home you can find a number of different types of content maintained in a number of different media. To use such content object types, a user is required to access multiple devices. Further, such content typically cannot be used together without requiring the use of multiple devices, each respectively using a portion of the content.

Hence, among other things, there exists a need in the art to address the aforementioned limitations.

FIELD OF THE INVENTION

Brief Summary of the Invention

The present invention is related to telecommunication systems in general, and in particular to systems and methods for distributing content objects. Various of the systems and methods utilize a number of content object entities that can be sources and/or destinations for content objects. A combination of abstraction and distinction engines can be used to access content objects from a source of content objects, format and/or modify the content objects, and redistribute the modified content object to one or more content object destinations. In some cases, an access point is included that identifies a number of available content objects, and identifies one or more content object destinations to which the respective content objects can be directed.

Such systems and methods can be used to select a desired content object, and to select a content object entity to which the content object is directed. In addition, the systems and methods can be used to modify the content object as to format and/or content. For example, the content object may be reformatted for use on a selected content object entity, modified to add additional or to reduce the content included in the content object, or combined with one or more other content objects to create a composite content object. This composite content object can then be directed to a content object destination where it can be either stored or utilized.

Some embodiments of the present invention provide systems for abstraction and distinction of content objects. These systems include an abstraction engine and a distinction engine. The abstraction engine is communicably coupled to a group of content object entities, and the distinction engine is communicably coupled to another group of content object entities. The two groups of content object entities are not necessarily mutually exclusive, and in many cases, a content object entity in one of the groups is also included in the other group. The first of the groups of content object entities includes content objects entities such as an appliance control system, a telephone information system, a storage medium including video objects, a storage medium including audio objects, an audio stream source, a video stream source, a human interface, the Internet, and an interactive content entity. The other of the groups of content object entities includes content object entities such as an appliance control system, a telephone information system, a storage medium including video objects, a storage medium including audio objects, a human interface, the Internet, and an interactive content entity.

In some instances, two or more of the content object entities are maintained on separate partitions of a common database. In such instances, the common database can be partitioned using a content based schema, while in other cases the common database can be partitioned using a user based schema.

In particular instances, the abstraction engine is operable to receive a content object from one of the groups of content object entities, and to form the content object into an abstract format. As just one example, this abstract format can be a format that is compatible at a high level with other content formats. In other instances, the abstraction engine is operable to receive a content object from one of the content object entities, and to derive another content object based on the aforementioned content object. Further, the abstraction engine can be operable to receive yet another content object from one of the content object entities and to derive an additional content object there from. The abstraction engine can then combine the two derived content objects to create a composite content object. In some cases, the distinction engine accepts the composite content object and formats it such that it is compatible with a particular group of content object entities. In yet other instances, the abstraction engine is operable to receive a content object from one group of content object entities, and to form that content object into an abstract format. The distinguishing engine can then conform the abstracted content object with a standard compatible with a selected one of another group of content object entities.

In some other instances, the systems include an access point that indicates a number of content objects associated with one group of content object entities, and a number of content objects associated with another group of content object entities. The access point indicates from which group of content object entities a content object can be accessed, and a group of content object entities to which the content object can be directed.

Other embodiments of the present invention provide methods for utilizing content objects that include accessing a content object from a content object entity; abstracting the content object to create an abstracted content object; distinguishing the abstracted content object to create a distinguished content object, and providing the distinguished content object to a content object entity capable of utilizing the distinguished content object. In some cases, the methods further include accessing yet another content object from another content object entity, and abstracting that content object entity to create another abstracted content object entity. The two abstracted content object entities can be combined to create a composite content object entity. In one particular case, the first abstracted content object is a video content object and the second abstracted content object is an audio content object. Thus, the composite content object includes audio from one source, and video from another source. Further, in such a case, abstracting the video content object can include removing the original audio track from the video content object prior to combining the two abstracted content objects. As yet another example, the first abstracted content object can be an Internet object, while the other abstracted content object is a video content object.

In other cases, the methods can further include identifying a content object associated with one group of content object entities that has expired, and removing the identified content object. Other cases include querying a number of content object entities to identify one or more content objects accessible via the content object entities, and providing an access point that indicates the identified content objects and one or more content object entities to which the identified content objects can be directed.

Yet other embodiments provide methods for accessing content objects within a customer premises. Such methods include identifying content object entities within the customer premises, and grouping the identified content objects into two or more groups of content object entities. At least one of the groups of content object entities include sources of content objects, and at least another of the groups of content object entities include destinations of content objects. The methods further include providing an access point that indicates the at least one group of content object entities that can act as content object sources, and at least another group of content object entities that can act as content object destinations. In some cases, the methods further include mixing two or more content objects from the first plurality of content object entities to form a composite content object, and providing the composite content object to a content object entity capable of utilizing it. In other cases, the methods further include eliminating a portion of a content object accessed from one group of content object entities and providing this reduced content object to another content object entity capable of utilizing the reduced content object entity.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
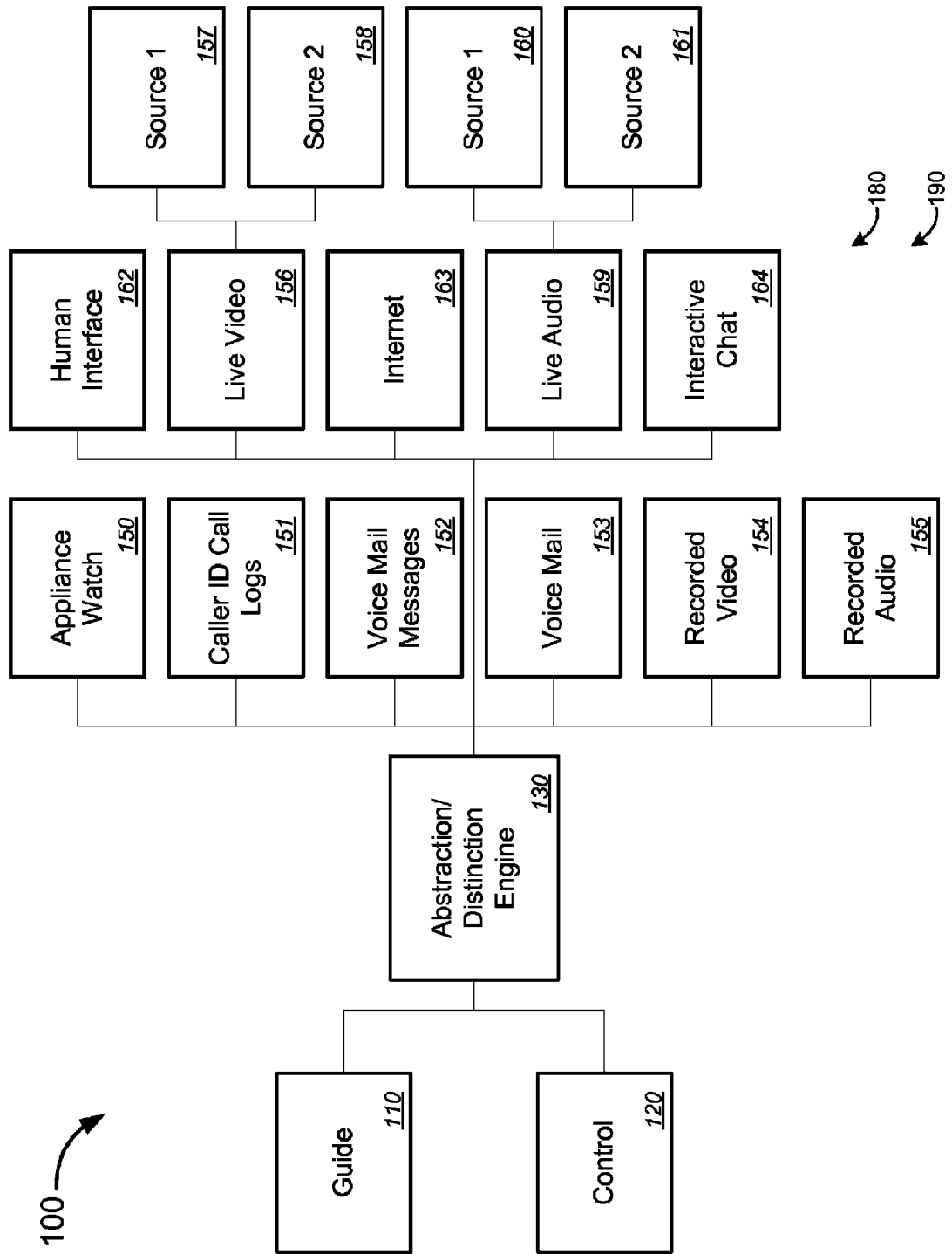
FIG. 1 illustrates a block diagram of an abstraction and distinction engine in accordance with various embodiments of the present invention.

The present invention is related to telecommunication systems in general, and in particular to systems and methods for distributing content objects. In some embodiments of the present invention, a content access point is provided that includes a guide to various content objects maintained in relation to a customer premises. In some cases, this content access point is implemented as a combination of hardware and software, however, one of ordinary skill in the art will appreciate a variety of implementation methods that can be used in accordance with the present invention. Via a guide associated with the access point, a list of all content objects available to a consumer can be displayed, and commands requesting various of the content objects and/or portions thereof can be received and processed. Thus, in some cases, the present invention provides a unifying tool allowing a consumer to access a variety of content objects from a variety of content object entities, manipulate those content objects, and utilize those content object via one or more content object entities.

As used herein, a content object can be any content maintained as an accessible object that can be accessed, utilized, and/or stored. Thus, for example, a content object can include, but is not limited to, voicemail, email, video, audio, movies, music, games, email, live broadcasts, user preferences, appliance status information, documents, Internet web pages, and the like. Further, as used herein a content object entity can be any entity capable of storing, sourcing, and/or utilizing a content object. In some cases, content object entities are classified as content object sources, content object destinations, or a combination thereof. Thus, for example, a voice mail system may be both a content object destination and a content object source. This is because the voice mail system can be both a source of audio content objects and a destination for an audio content object. Other examples of content object entities include, but are not limited to, appliance watch systems, caller identification systems, call logging systems, databases of recorded video and/or audio objects, sources of live video and/or audio objects, human interfaces, the Internet, databases of interactive content, databases of documents, video players, audio players, and/or graphical displays. Based on the disclosure provided herein, one of ordinary skill in the art will appreciate the myriad of content objects and/or content object entities that can be utilized in relation to embodiments of the present invention.

Various of the systems and methods utilize a number of content object entities that can be sources and/or destinations for content objects. A combination of abstraction and distinction engines can be used to access content objects from a source of content objects, format and/or modify the content objects, and redistribute the modified content object to one or more content object destinations. In some cases, an access point is included that identifies a number of available content objects, and identifies one or more content object destinations to which the respective content objects can be directed.

Such systems and methods can be used to select a desired content object, and to select a content object entity to which the content object is directed. In addition, the systems and methods can be used to modify the content object as to format and/or content. For example, the content object may be reformatted for use on a selected content object entity, modified to add additional or to reduce the content included in the content object, or combined with one or more other content objects to create a composite content object. This composite content object can then be directed to a content object destination where it can be either stored or utilized.

Some embodiments of the access point, abstraction engine, and/or distinction engine are implemented as an appliance that can be attached to a network interface device (NID) to provide a convenient content object access point for a customer premises. Alternatively, the abstraction and/or distinction engine can be implemented as a microserver associated with the NID. Information about such NIDs and microservers can be obtained from U.S. application Ser. No. 10/377,282, filed Feb. 27, 2003 by Casey et al. and entitled "Systems And Methods For Displaying Data Over Video"; U.S. application Ser. No. 10/356,364, filed Jan. 31, 2003 by Phillips et al. and entitled "Packet Network Interface Device And Systems And Methods For Its Use"; U.S. application Ser. No. 10/356,688, filed Jan. 31, 2003 by Phillips et al. and entitled "Systems, Methods And Apparatus For Providing A Plurality Of Telecommunications Services"; U.S. application Ser. No. 10/356,338, filed Jan. 31, 2003 by Phillips et al. and entitled "Configurable Network Interface Device And Systems And Methods For Its Use"; U.S. application Ser. No. 10/367,596, filed Feb. 14, 2003 by Casey et al. and entitled "Systems And Methods For Delivering A Data Stream To A Video Appliance"; U.S. application Ser. No. 10/367,597, filed Feb. 14, 2003 by Casey et al. and entitled "Systems And Methods For Providing Application Services"; U.S. application Ser. No. 10/377,290, filed Feb. 27, 2003 by Phillips et al. and entitled "Systems And Methods For Forming Picture-In-Picture Signals"; U.S. application Ser. No. 10/377,283 filed Feb. 27, 2003 by Phillips et al. and entitled "Systems And Methods For Monitoring Visual Information"; U.S. application Ser. No. 10/377,584 filed Feb. 27, 2003 by Phillips et al. and entitled "Systems And Methods For Delivering Picture-In-Picture Signals At Diverse Compressions And Bandwidths"; U.S. application Ser. No. 10/377,281 filed Feb. 27, 2003 by Phillips et al. and entitled "Systems And Methods For Providing And Displaying Picture-In-Picture Signals"; U.S. application Ser. No. 10/444,941, filed May 22, 2003 by Phillips et al. and entitled "Systems And Methods For Providing Television Signals Using A Network Interface Device"; U.S. application Ser. No. 10/448,249, filed May 22, 2003 by Phillips et al. and entitled "Methods And Apparatus For Delivering A Computer Data Stream To A Video Appliance With A Network Interface Device"; and U.S. Application Ser. No. 10/624,454, filed Jul. 21, 2003 by Casey et al. and entitled "Systems And Methods For Integrating Microservers With A Network Interface Device". Each of the aforementioned patent applications share one or more inventors, and are assigned to an entity common hereto. Further, the entirety of each of the aforementioned patent applications is incorporated herein by reference for all purposes.

This appliance may include a guide that incorporates a broad range of content media into a single access point. This range of content media can include, but is not limited to, traditional content including movies, music, games, voicemails, emails, software, security video, emergency alerts, and any other content that comes to the home or can be requested from the network via providers.

Some embodiments of the present invention provide systems for abstraction and distinction of content objects. These systems include an abstraction engine and a distinction engine. The abstraction engine is communicably coupled to a group of content object entities, and the distinction engine is communicably coupled to another group of content object entities. The two groups of content object entities are not necessarily mutually exclusive, and in many cases, a content object entity in one of the groups is also included in the other group. The first of the groups of content object entities includes content objects entities such as an appliance control system, a telephone information system, a storage medium including video objects, a storage medium including audio objects, an audio stream source, a video stream source, a human interface, the Internet, and an interactive content entity. The other of the groups of content object entities includes content object entities such as an appliance control system, a telephone information system, a storage medium including video objects, a storage medium including audio objects, a human interface, the Internet, and an interactive content entity.

In particular instances, the abstraction engine is operable to receive a content object from one of the groups of content object entities, and to form the content object into an abstract format. As just one example, this abstract format can be a format that is compatible at a high level with other content formats. In other instances, the abstraction engine is operable to receive a content object from one of the content object entities, and to derive another content object based on the aforementioned content object. Further, the abstraction engine can be operable to receive yet another content object from one of the content object entities and to derive an additional content object there from. The abstraction engine can then combine the two derived content objects to create a composite content object. In some cases, the distinction engine accepts the composite content object and formats it such that it is compatible with a particular group of content object entities. In yet other instances, the abstraction engine is operable to receive a content object from one group of content object entities, and to form that content object into an abstract format. The distinguishing engine can then conform the abstracted content object with a standard compatible with a selected one of another group of content object entities.

Turning to FIG. 1, a combination guide, abstraction, and distinction system 100 in accordance with various embodiments of the present invention is illustrated. System 100 includes a guide 110, a control 120, and abstraction/distinction engine 130, and a number of content object entities 150-164. Content object entities 150-164 can include, but are not limited to, an appliance control system 150, a telephone information system 151-153, a storage medium including video objects 154, a storage medium including audio objects 155, an audio stream source 159-161, a video stream source 156-158, a human interface 162, the Internet 163, and an interactive content entity 164. Human interface 162 can be an audio reception device for encoding voice data, a keyboard, a pen interface, a display including televisions, and audio player, and/or the like. Interactive content entity 164 can be a computer program that provides responses to a user based on a user's actions. Live video and audio sources may include feeds from multiple sources. For example, live video stream 156 may include a feed from a cable television provider for source one 157, and from an antenna for source two 158. Based on this disclosure, one of ordinary skill in the art will appreciate that any number of video sources or channels may be provided via a common live video content object entity. Similarly, one of ordinary skill in the art will appreciate that any number of audio sources or channels may be provided via a common live audio content object entity. Further, one of ordinary skill in the art will recognize other content object entities to which the systems and methods of the present invention can be directed.

As previously discussed, these various content object entities 150-164 can be organized into groups of content object entities 180, 190. One group of content object entities 180 can include, for example, all content object entities that are capable of acting as a content object destination. Thus, for example, this group may include a television capable of receiving and displaying video content objects. Another group of content object entities 190 may include all content object entities that are the source of content objects. Thus, for example, live video feed 156 may be included in this group. It will be appreciated that some of the content object entities can be included in both of the aforementioned groups.

In some embodiments of the present invention, control 120 queries each of content object entities 150-164 to determine content objects available, format of the content objects, and content objects entities and content formats that the content object entities are capable of utilizing. Thus, for example, a query of live video feed 156 would indicate a number of content objects corresponding to available video channels, but would not indicate that live video feed 156 can utilize any content objects. Alternatively, a query of human interface 162 may indicate a television capable of receiving and utilizing content objects in a particular video format, but not providing any sourced content objects.

Using this query information, control 120 assembles a listing of all available content objects and the respective formats of the content objects. In addition, control 120 assembles a listing of all content object entities capable of receiving content objects, and the content object format that each content object entity is capable of supporting. Further, control 120 identifies all format conversions that can be provided by abstraction/distinction engine 130. From this information control 120 creates a guide 110 that indicates all available content objects, and all content object entities to which the available content object entities can be directed.

Various examples are provided to illustrate the process. In the first, a television capable of receiving an NTSC signal is identified as a content object entity (human interface 162), and live video source 156 providing an NTSC video stream is identified as another content object entity. Thus, guide 110 includes a listing for video source 156 indicating that the content object can be displayed on the identified television. The second example expands on the first where a computer display capable of displaying raster video signals is identified, and abstraction/distinction engine 130 includes capability for converting an NTSC video signal to a raster format signal. Thus, guide 110 would include a listing for video source 156 indicating that the content object can be displayed on either the television or the computer display.

As yet another example, control 120 may identify an MPEG video content object maintained on recorded video media 154, and an uncompressed recorded audio content object on recorded audio media 155. Further, control 120 may identify a television capable of displaying an NTSC signal including both audio and video, and identify decompression capability and NTSC conversion capability in abstraction/distinction engine 130. Thus, guide 110 would list the MPEG video content object indicating that it can be displayed on the identified television, and listing the audio object indicating that it can also be displayed on the identified television.

Thus, as just one exemplary use of system 100, a user could select both the audio content object and the video content object and indicate that a combination of the two objects are to be displayed on the identified television. This selection would be passed by control 110 to abstraction/distinction engine 130. In turn, abstraction/distinction engine 130 can access the MPEG video content object from recorded video media 154, and decompress the MPEG video content object to create an uncompressed digital video object. This process is generically referred to herein as abstracting—or converting a content object from one format and/or location to a more generally usable format and/or location. Also, abstraction/distinction engine 130 accesses the audio content object. Such an access can also be referred to as abstracting as the content is being moved to a more accessible location. Then, the audio and video content objects can be merged to create a composite content object. This composite content object can then be modified by abstraction/distinction engine 130 into a format compatible with the identified television. Thus, the digital audio and video are merged, and subsequently converted to an NTSC video signal that is then passed to the identified television for display. This process of modification into an NTSC is one form of distinction. The present invention can employ various forms of distinction all generically referred to herein as distinction or distinguishing. In general, distinction includes modifying the format of a content object and/or moving the content object to a content object entity where it can be displayed.

As yet another example, a user can request a web page to record a broadcast movie. In such a case, guide 110 may be displayed as a web page accessible to the user. Via guide 110, a request for a selected content object indicating that the content object is to be directed to a digital video recorder can be received. The request can be passed to a NID associated with a customer premises, and from the NID, the request can be passed to control 120. Control 120 can convert the request packet and determine which of the various content object entities has access to the requested content object. Based on this information, control 120 can direct abstraction/distinction engine 130 to access the requested content object from the Internet 163 at the specified Internet address, and to format the received information in a format compatible with the selected digital video recorder. Thus, abstraction engine 130 accesses the Internet 163 and retrieves an web page including a video stream. This video stream can then be converted to a digital video format compatible with the digital video recorder. Once the recording is complete, an alert can be sent to control 120. The recorded video is then maintained as a content object on the digital video recorder. This content object can then be accessed and sent to other content object entities.

As a modification of the previous example, control 120 may include a machine interface that can be programmed with a user's preferences. Based on these preferences, control 120 can query the various content object entities to identify programs that match the preferences, and to automatically record those programs to a digital recorder. Thus, the digital recorder may be automatically populated with a number of content objects matching the user's preferences. These content objects can be derived from a number of different content object entities, and can all be abstracted and/or distinguished such that they exist in a common file format compatible with the digital recorder. In turn, these content objects can be requested from the digital recorder, and abstracted and/or distinguished for utilization on another content object entity. In some cases, the user's preferences can be derived from monitoring the user's access habits. In addition, guide 110 may also include other content guides available from various content object entities. These can include, for example, channel lineups, television guides, video on demand schedules, and/or the like.

Based on the disclosure provided herein, one of ordinary skill in the art will appreciate a number of format conversions that can be performed by abstraction/distinction engine 130. Such format conversions can include compression, decompression, encryption, decryption, conversions between data types, and/or the like. The following lists just some examples of possible conversions: an MPEG2 to MPEG4 conversion, an MPEG to a proprietary video standard conversion, video resolution adjustments for display on a variety of monitor types, speech to text (e.g., voicemail to email), text to speech (e.g., email to voicemail), text to text (e.g., home caller ID to cell phone caller ID), data to text (e.g., alerts from appliances indicating a change of state such as, for example, a door opening), data to HTML or other computer formats (e.g., requests from a digital recorder to serve a web page), HTML resolution adjustments allowing the HTML to be displayed in a different resolution environment. Again, based on this disclosure, one of ordinary skill in the art will appreciate that the systems and methods of the present invention can be applied in relation to a number of other conversions.

Systems in accordance with the present invention can support a large number of content object types. Such content object types can include, but are not limited to, recorded video content from content providers, recorded security footage from home/remote cameras, real-time video baby monitors, real-time computer usage monitoring via picture-in-picture display, recorded incoming voicemails, recorded outgoing voicemail greetings, voice over IP, caller-id, PSTN caller-id, call Logs, on Screen TV guide, on screen internet broadcast guide, alerts from emergency alert system, digital recorder requests from a web page, software downloads for internet, video on demand, audio on demand, games on demand, and/or the like. Based on this disclosure, one of ordinary skill in the art will appreciate a number of other content object types that can be used in relation to the present invention.

Further, abstraction/distinction engine 130 can be updatable by adding additional software offering different conversions as the need arises. Thus, for example, where a user installs a new voice mail system, conversion software capable of accepting audio content objects from the new voice mail system, and for converting the audio signals to a standard digital audio signal can be added. Thus, the conversion software can be updated to allow content objects from one of content object entities 150-164 to be utilized by a large number of other content object entities.

Also, based on the disclosure provided herein, one of ordinary skill in the art will recognize a number of uses for system 100. Such uses can include, but are not limited to, utilizing content objects on content object entities where the content object otherwise would not be used, combining content objects to create composite content objects, and/or providing a user friendly selection point for a large variety of content object types. It should also be recognized that the output of abstraction/distinction engine 130 can be formatted for display on a content object entity, or for additional processing by another content object entity.

In particular embodiments of the present invention, a machine interface is provided that allows a user to program control 120 to define the types of content objects that the user would like displayed, and which content object entity the user would like to use for display. In this way, the user can simplify guide 110 making it more accessible and/or useful to the user. Alternatively, or in addition, the user may select a content object entity, and guide 110 can present a list of all content objects that can be utilized by the selected content object entity.

In some cases, various recorded data can be maintained across content object entities in different logical or physical partitions. Thus, for example one user in a customer premises may be allotted a certain physical storage space on one or more content object entities. Once the user's storage space is exhausted, one or more content objects will need to be removed from the user's storage space before an additional content object can be added. Alternatively, or in addition, the partition can be logical. Such a partition can segregate content objects for use by parents and children within the same customer premises.

Thus, guide 110 can also assemble access information indicating which user and/or group of user's can access a particular identified content object. For example, in a customer premises there could be three different personal video recorders all attached to the network. Control 120 could access all of these devices to create a central guide 110. The table of gathered information could appear as the following exemplary table:

| Content Name | Description | License Info | Device Name (DNS Name) | Location (Local/Remote) | Distribution | Access Group |
|---|---|---|---|---|---|---|
| Scooby Doo | Video - Carton | Full Usage | PVR1.NID-IP | Local | World | United States |
| Terminator | Video - Action | 1 Time View | PVR2.NID-IP | Local | State | United States |
| Blink 182 Concert | Audio - Music Video | Full Usage | www.music.com | Remote | City | Denver, CO |
| Voicemails | Voice - mail | Full Usage | Voicemail.NID-IP | Local and Remote (Second Copy) | Home | Casey Family Only |

Figure 2:
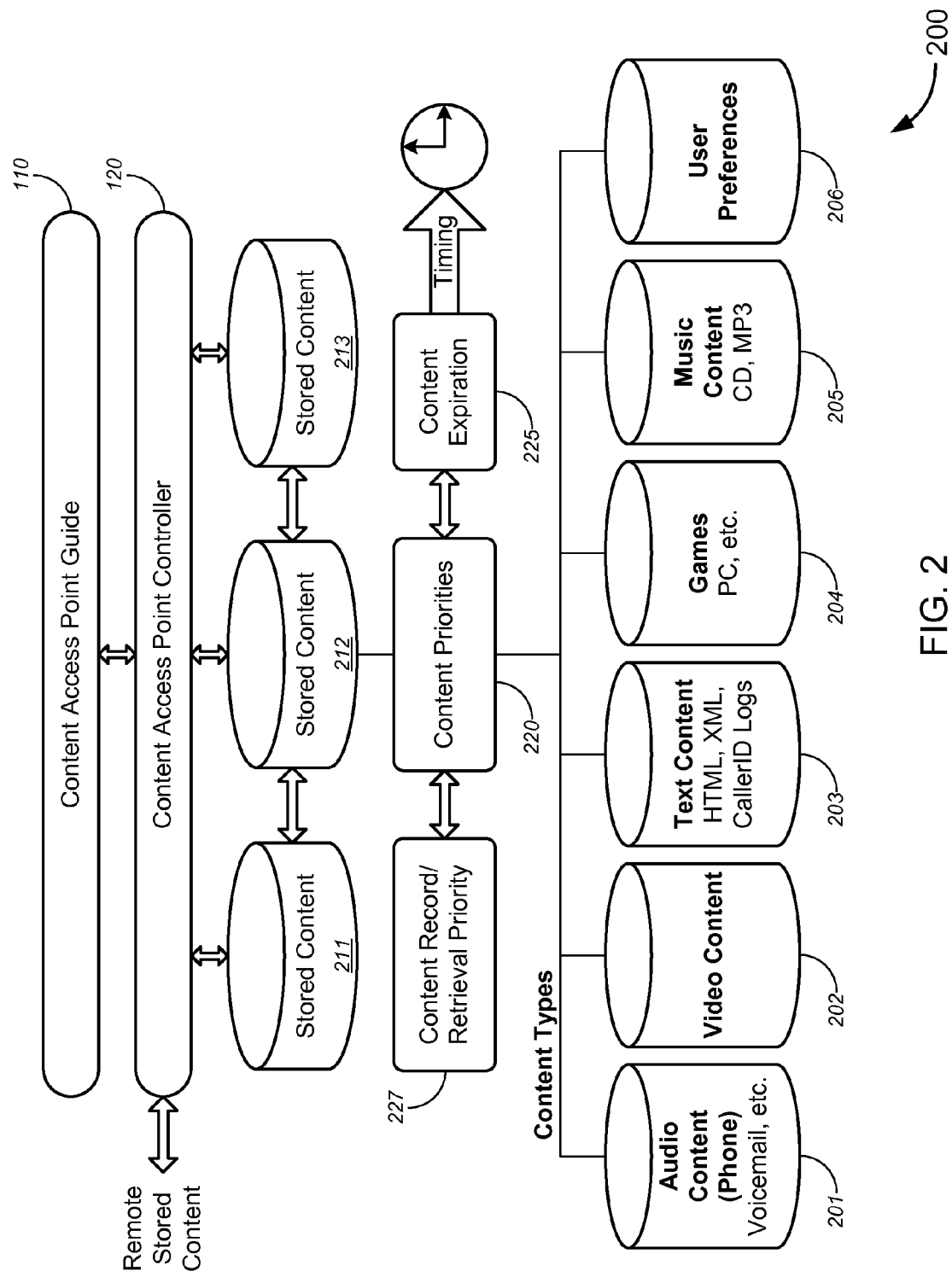
FIG. 2 illustrates a hierarchical diagram of various content object entities accessible via the abstraction and distinction engine of FIG. 1.

Turning to FIG. 2, a hierarchical diagram 200 illustrates various content object entities 201-206 accessible via the abstraction and distinction engine 130 illustrated in FIG. 1. In particular, hierarchical diagram 200 illustrates one approach in accordance with some embodiments of the present invention for removing expired content objects. Content objects can either be expired after a specified time or after a predetermined number of uses of the content object (e.g., the content object is consumed). As illustrated, content objects can be moved from a first tier of content object entities 201-206, to a second tier of content object entities 211-213 maintained as a more accessible storage area. Content objects are passed to this more accessible storage area based on priorities and expiration information. Thus, content object entities 201-206 can be queried by control 120 to identify content objects available thereon. The status of each of the identified content objects is determined by a content priorities engine 220. Determination of status includes a determination of whether the identified content object has expired 225, and a ranking of the identified content object as to importance 227 relative to other identified content objects. For example, priority can be based on the importance of the user for which the content object is being moved, or for the likelihood that the content object will be utilized.

In addition to the standard expiration of content objects, a feature can be set to store critical information and delete other data when there is no other space available. For example, video content objects could be expired if storage for voicemails and emails is exhausted and needs to be expanded to support incoming messages. The user and/or a service provider providing a NID can define these options.

To support additional storage, content can be moved to secondary storage automatically as space is required. This can be performed automatically after a specific condition is met (e.g., after ten days content objects can be moved to secondary storage), or manually via a user request (e.g., watch a movie and then record to DVD). Another example of an automatic record would be to copy all content to secondary storage to CD-ROMs if it is audio based. This solution will free up space on a space-constrained system. Further, in some cases, system 100 can include the ability to automatically copy any backup data to the new drive once it was replaced. The data that is set for backup would be user configurable. This system could use standard data protection schemes like Disk Mirroring and Stripping as are known in the art.

Some embodiments of the present invention further include a license monitoring application. This application can allow a user to purchase a content object, and to remove the content object once the license has expired, and/or to limit access to the content object to accesses that conform to the terms of the license. In some cases, the licenses can be stored separate from the content objects to which the licenses are related. Thus, when a content object is selected, an access to the license is also initiated. A separate interface can be provided for storing licensed content objects to an offline media (i.e., CD-ROMs, Flash Cards, or external drives). When the content object is selected, an associated license is queried and where the license is valid, the content object is accessed from the offline media. If any of the content object is presented in an encrypted format, the license will provide rights to access one or more decryption keys useful for decrypting the content object.

FIG. 3 graphically represent examples in accordance with the present invention for utilizing system 100. Turning to FIG. 3a, a graphical representation 301 of system 100 combining an audio content object 311 with a video content object 312 is illustrated. Audio content object 311 can be, for example, a streaming audio signal available from the Internet, while video content object 312 can be, for example, a cable television channel. Audio content object 311 and video content object 312 are abstracted by abstraction/distinction engine 130 to a combinable format. Then, audio content object 311 and video content object 312 are combined 321, and the combined signals are distinguished for utilization by a determined content object entity. Upon distinction, a composite content object 331 is formed.

It will be appreciated that system 100 can include the ability to combine a number of different content object types including, for example, audio, video, or data tracks to produce enhanced content specified by the user. The example of graphical representation 301 would be very useful where a user is watching a sporting event on television, but would rather listen to the play calling provided on a radio station available over the Internet. System 100 thus accesses only the video portion of the television program, and synchronizes it with the audio portion. This synchronization can include delaying one or the other portions such that they align. This delaying function can be aided by a user that can indicate when the two portions have been synchronized. Thus, for example, the program may be displayed with increasing amounts of delay added to one or the other segments until the user indicates that the delay is correct. Once the delay is correct, the program combination continues.

Turning to FIG. 3b, a graphical representation 302 illustrates another exemplary use of system 100 in accordance with other embodiments of the present invention. In this example, only the audio portion of a television program is recorded. In operation, the content object entity supplying the television program is selected, and an audio only content object entity is selected to receive the program. Abstraction/distinction engine 130 separates the audio and video portions of the selected television program, and provides the audio portion to the selected content object entity 341. The selected content object entity 341 can be, for example, a CD recorder, an MP3 player, a radio, and/or the like.

Figure 3C:
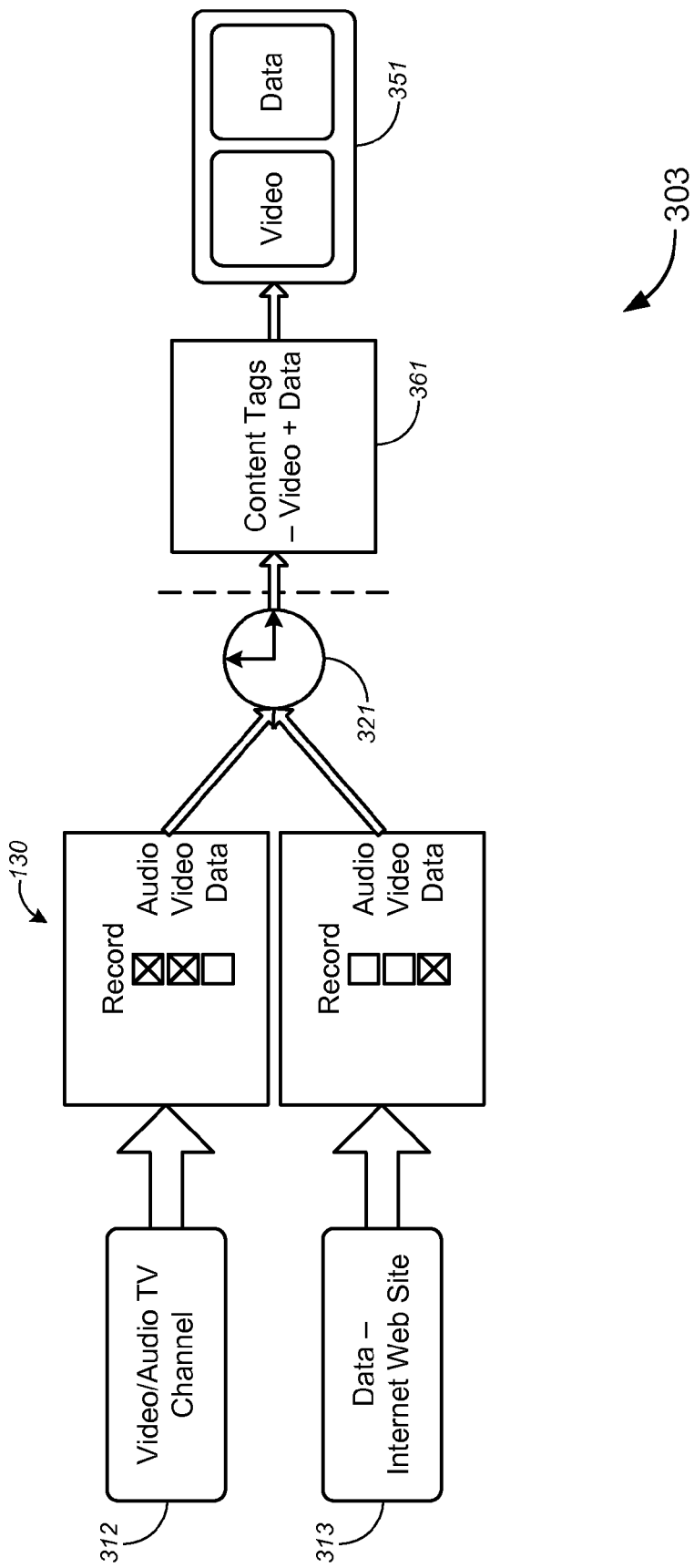
FIG. 3 illustrate various applications of the abstraction and distinction engine of FIG. 1 in accordance with various embodiments of the present invention.

Turning to FIG. 3c, a graphical representation 303 illustrates yet another exemplary use of system 100 in accordance with other embodiments of the present invention. In this example, a video content object 312 is combined with a data stream content object 313 obtained from the Internet. The combination creates a composite content object 351. A clock 321 can be used to synchronize the content objects and the video content object can be tagged 361 to identify where in the video stream the data is to be added. In this way video programming can be augmented to include additional details and background information based on the video program.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method for utilizing content objects by a content access point within a customer's premises, wherein the method comprises:

creating, at the content access point, a first list of available content objects and a respective format of each available content object, wherein the content access point is implemented by a demarcation device that isolates the customer's premises network from a provider's network, the demarcation device comprising a broadband modem;

creating, at the content access point, a second list of content object entities and one or more respective formats that each content object entity is capable of supporting;

creating, at the content access point, a guide indicating available content objects and, for each particular available content object, one or more content object entities to which that particular content object can be directed, based at least in part on the first list and the second list, each of the one or more content object entities being a separate device that is capable of displaying that particular content object;

accessing, with the content access point, a first content object from a first content object entity within the customer's premises, wherein the first content object is in a first content format compatible with the first content object entity and wherein the first content object is selected from a group consisting of a voicemail object, an email object, a video object, an audio object, and an Internet web page;

abstracting, with the content access point, the first content object to create a second content object in an abstract format, wherein the abstract format is compatible with a plurality of content formats;

distinguishing, at the content access point, the second content object to create a third content object, wherein the third content object is in a second content format that is compatible with a second content object entity within the customer's premises, wherein the third content object is selected from a group consisting of a voicemail object, an email object, a video object, an audio object, and an Internet web page, and wherein the third content object is different from the first content format; and providing, from the content access point, the third content object to the second content object entity.

2. The method of claim 1, wherein the method further comprises:

accessing a fourth content object from a third content object entity wherein the fourth content object is in a third content format compatible with the third content object entity, wherein the fourth content object is selected from a group consisting of a voicemail object, an email object, a video object, an audio object, a document object, and an Internet web page, and wherein the fourth content object is different from the first content format and the second content format;

abstracting the fourth content object to create a fifth content object; and combining the fifth content object with the second content object, wherein the combination of the second and fifth content objects are distinguished to create the third content object.

3. The method of claim 2, wherein the first content object is a video object, and wherein the fourth content object is an audio object.

4. The method of claim 3, wherein abstracting the first content object includes separating an audio portion from a video portion of the video object.

5. The method of claim 2, wherein the first content object is a video object, and wherein the fourth content object is an Internet object.

6. The method of claim 2, wherein the first content object entity is selected from a group consisting of an appliance control system, a telephone information system, a storage medium including video objects, a storage medium including audio objects, an audio stream source, a video stream source, a human interface, the Internet, and an interactive content entity.

7. The method of claim 6, wherein the second content object entity is selected from a group consisting of an appliance control system, a telephone information system, a storage medium including video objects, a storage medium including audio objects, an audio stream source, a video stream source, a human interface, the Internet, and an interactive content entity.

8. The method of claim 7, wherein the first content object entity is different from the second content object entity.

9. The method of claim 7, wherein the third content object entity is selected from a group consisting of an appliance control system, a telephone information system, a storage medium including video objects, a storage medium including audio objects, an audio stream source, a video stream source, a human interface, the Internet, and an interactive content entity.

10. The method of claim 9, wherein the first content object entity is different from the second content object entity and the third content object entity.

11. The method of claim 1, wherein the method further comprises:

identifying a content object associated with one of the first plurality of content object entities that has expired; and
removing the identified content object.

12. The method of claim 1, wherein the first content object is a video object, wherein abstracting the first content object includes removing a visual portion of the video object, and wherein the second content object includes an audio portion of the video object.

13. The method of claim 1, wherein the first content object comprises a voicemail and the third content object comprises an email.

14. The method of claim 1, wherein the first content object comprises an email and the third content object comprises a voicemail.

15. The method of claim 1, further comprising: limiting access to the first and second content objects to conform with terms of a license to the first content object.

16. The method of claim 1, wherein the demarcation device is incorporated within a premises network interface device ("NID") that is affixed to an external wall of the customer's premises.

17. A content access point for utilizing content objects by a content access point within a customer's premises, the content access point comprising:

a processor; and a storage medium having stored thereon a set of instructions for controlling operation of the content access point, the set of instructions comprising:

instructions for creating a first list of available content objects and a respective format of each available content object, wherein the content access point is located within a demarcation device that isolates the customer's premises network from a provider's network;

instructions for creating, at the content access point, a second list of content object entities and one or more respective formats that each content object entity is capable of supporting;

instructions for creating, at the content access point, a guide indicating available content objects and, for each particular available content object, one or more content object entities to which that particular content object can be directed, based at least in part on the first list and the second list, each of the one or more content object entities being a separate device that is capable of displaying that particular content object;

instructions for accessing a first content object from a first content object entity within the customer's premises, wherein the first content object is in a first content format compatible with the first content object entity and wherein the first content object is selected from a group consisting of a voicemail object, an email object, a video object, an audio object, and an Internet web page;

instructions for abstracting the first content object to create a second content object in an abstract format, wherein the abstract format is compatible with a plurality of content formats;

instructions for distinguishing the second content object to create a third content object, wherein the third content object is in a second content format that is compatible with a second content object entity within the customer's premises, wherein the third content object is selected from a group consisting of a voicemail object, an email object, a video object, an audio object, and an Internet web page, and wherein the third content object is different from the first content format; and instructions for providing the third content object to the second content object entity;

wherein the content access point is implemented by a demarcation device that isolates the customer's premises network from a provider's network, the demarcation device comprising a broadband modem.

* * * * *

UNITED STATES PATENT AND TRADEMARK OFFICE
CERTIFICATE OF CORRECTION

PATENT NO. : 8,112,449 B2
APPLICATION NO. : 10/632661
DATED : February 7, 2012
INVENTOR(S) : Steven M. Casey et al.

It is certified that error appears in the above-identified patent and that said Letters Patent is hereby corrected as shown below:

Column 2, Line 31, delete "object there from." and insert --object therefrom.--, therefor.

Column 8, Line 24, delete "retrieves an web page" and insert --retrieves a web page--, therefor.

Signed and Sealed this
Twenty-ninth Day of May, 2012

David J. Kappos
*Director of the United States Patent and Trademark Office*